United States Patent
Müller et al.

(10) Patent No.: US 10,792,702 B2
(45) Date of Patent: Oct. 6, 2020

(54) PASSIVATION COMPOSITION COMPRISING A SILANE-MODIFIED SILICATE COMPOUND

(71) Applicant: Ewald Dörken AG, Herdecke (DE)

(72) Inventors: Melanie Müller, Hagen (DE); Marcel Roth, Düsseldorf (DE); Ingo Klüppel, Bochum (DE)

(73) Assignee: EWALD DÖRKEN AG, Herdecke (DE)

( * ) Notice: Subject to any disclaimer, the term of this patent is extended or adjusted under 35 U.S.C. 154(b) by 408 days.

(21) Appl. No.: 15/539,879

(22) PCT Filed: Dec. 22, 2015

(86) PCT No.: PCT/EP2015/080979
§ 371 (c)(1),
(2) Date: Jun. 26, 2017

(87) PCT Pub. No.: WO2016/107791
PCT Pub. Date: Jul. 7, 2016

(65) Prior Publication Data
US 2017/0348730 A1     Dec. 7, 2017

(30) Foreign Application Priority Data
Dec. 30, 2014    (EP) .................................... 14200636

(51) Int. Cl.
| | | |
|---|---|---|
| *C23C 22/06* | (2006.01) | |
| *C23C 22/48* | (2006.01) | |
| *B05D 7/16* | (2006.01) | |
| *C01B 33/32* | (2006.01) | |
| *C23C 22/42* | (2006.01) | |
| *C23C 22/83* | (2006.01) | |
| *C23C 22/53* | (2006.01) | |
| *C23C 22/40* | (2006.01) | |
| *C23C 22/46* | (2006.01) | |
| *C23C 22/00* | (2006.01) | |

(52) U.S. Cl.
CPC .............. *B05D 7/16* (2013.01); *C01B 33/325* (2013.01); *C23C 22/06* (2013.01); *C23C 22/40* (2013.01); *C23C 22/42* (2013.01); *C23C 22/46* (2013.01); *C23C 22/53* (2013.01); *C23C 22/83* (2013.01); *C23C 2222/20* (2013.01)

(58) Field of Classification Search
CPC ........................... C23C 2222/20; C23C 22/06
See application file for complete search history.

(56) References Cited

U.S. PATENT DOCUMENTS

2004/0170840 A1* 9/2004 Matsukawa ............. C23C 22/34
428/422.8

FOREIGN PATENT DOCUMENTS

KR    2005-0059816    *    6/2005    ............. C23F 11/04

* cited by examiner

*Primary Examiner* — Lois L Zheng
(74) *Attorney, Agent, or Firm* — Edward E. Sowers; Brannon Sowers & Cracraft PC

(57) ABSTRACT

The invention relates to a method for producing a silane-modified silicate. In order to obtain optimal corrosion protection properties, a silane compound according to the invention is at least partially hydrolyzed and/or condensed in the presence of a silicate compound at a pH value greater than or equal to 8 and then a pH value less than or equal to 7 is set by adding acid. The invention further relates to an aqueous acidic passivation composition for metal substrate coated with the passivation composition.

6 Claims, No Drawings

PASSIVATION COMPOSITION COMPRISING A SILANE-MODIFIED SILICATE COMPOUND

CROSS-REFERENCES TO RELATED APPLICATIONS

This application is a National Stage filing of International Application PCT/EP 2015/080979 (WO 2016/107791), filed Dec. 22, 2015, entitled PASSIVATION COMPOSITION COMPRISING A SILANE-MODIFIED SILICATE COMPOUND, claiming priority to EP 14 200 636.0 filed Dec. 30, 2014. The subject application claims priority to PCT/EP 2015/080979, and to EP 14 200 636.0, and incorporates all by reference herein, in their entirety.

BACKGROUND OF THE INVENTION

The invention relates to a passivation composition comprising silane-modified silicate compounds and also to a method for preparing a silane-modified silicate and a metallic substrate coated with this passivation composition.

In known passivation compositions for the anti-corrosive coating of metallic substrates, silicates and silanes are frequently used. It has been found that silane-modified silicate compounds are more suitable for anti-corrosive coatings than a mixture of the individual silanes and silicates. Silane-modified silicate compounds, obtained by alkaline hydrolysis of the monomeric silane in silicatic solutions, in water glasses for example, are applied in the alkaline range, as in the teaching of EP 2 216 371 A1. Coatings containing acidic, colloidal silica particles are obtained by acidic hydrolysis of silananes in acidic silica sols. DE 198 14 605 A1 discloses an alkaline or acidic hydrolysis, depending on the silicate compound used, and KR 10 2005 005 9816 A discloses hydrolysis of silanes and silicates at strongly acidic pH and a subsequent adjustment of the passivation composition to a less acidic pH. With water glasses, however, hydrolysis in acid is not possible even with subsequent adjustment to a less acidic pH, since the silicates would flocculate.

DETAILED DESCRIPTION OF THE INVENTION

None of the alternatives known from the prior art fully exploit the potential anti-corrosive effect of silane-modified silicate compounds. It is the object of the invention, therefore, to propose an improved passivation composition prepared using silane-modified silicate compounds and an improved method for using silane-modified silicate compounds.

The passivation composition according to the invention for a metallic substrate, comprising a silicate compound, which has been silane-modified in the alkaline pH range, in acidic aqueous solution, is obtainable by at least partially hydrolyzing and/or condensing at least one silane in the presence of at least one silicate at a pH equal to or greater than 8, and then adjusting to a pH equal to or less than 7 by adding an acid.

According to the invention, the method for preparing a silane-modified silicate is carried out by the steps comprising at least partially hydrolyzing a silane in the presence of a silicate compound and at least partially condensing the hydrolyzed silane with the silicate at a pH equal to or greater than 8 to give a silane-modified silicate, and then adjusting to a pH equal to or less than 7 by adding an acid.

In the context of the operation of the invention, it has been found that the silane-modified silicate compounds formed by alkaline hydrolysis have an excellent anti-corrosive effect. The silane or siloxane is covalently bound to the silicate as a side-chain by hydrolysis and/or condensation in the alkaline medium. Where the terms hydrolysis and condensation are also used individually in the context of the description of this invention, they each refer to all the reactions occurring during the preparation of the silane-modified silicate compound. However, the anti-corrosive effect does not fully develop if the passivation composition with these alkaline-hydrolyzed silane-modified silicate compounds is also applied to the metallic substrate at an alkaline pH. However, if the acidification according to the invention to a pH equal to or less than 7 follows the partial or complete hydrolysis or condensation in the alkaline medium, then a further improved anti-corrosive effect of an acidic aqueous passivation composition, comprising silicates silane-modified in the alkaline medium, is observed.

An unexpected effect of the invention is that water glasses, which have been hydrolyzed or condensed with a silane or siloxane or mixtures thereof in an alkaline medium, can be acidified to a pH of 7 or less without precipitation of water glass. This is particularly clearly shown when using lithium silicate or lithium polysilicate and when using a mixture of water glasses comprising lithium silicate or lithium polysilicate. The passivation composition, comprising the silane-modified silicate compound generated by hydrolysis and/or condensation of the silane in an alkaline medium according to the invention, in a mixture with acid, can be used as an effective anti-corrosive coating at pH values of pH 7 or lower, typically at acidic pH values of at most pH 6 or of up to pH 5. A pH value of between 2 and 4 is preferably set on acidification, which can be achieved and maintained without precipitation or flocculation of the silane-modified silicate compound.

As a possible reason for the improved corrosion protection achieved with the acidic aqueous passivation composition according to the invention, it can be seen that the acidic passivation composition according to the invention etches the metal surface of the substrate, after which dissolved metal ions from the surface of the substrate are incorporated into the passivation. Such metal ions may be detected in the passivation layer, for example by means of GD-OES (glow discharge optical emission spectroscopy), e.g. zinc, iron and/or magnesium ions that are detectable in the form of zinc, iron and/or magnesium silicate. The etching of the metal surface of the substrate, which is effected by the acid of the passivation composition according to the invention, creates a chemically defined surface and can be clearly understood as an acidic cleaning step. In addition, the metal surface is leveled and the adhesion of the passivation layer is improved.

An advantageous effect is already shown when only a partial hydrolysis or condensation of silane in the presence of silicate is effected in alkaline aqueous solution. Frequently, the hydrolysis or condensation of silane in the presence of silicate to form a silane-modified silicate compound, however, is carried out completely in the alkaline state. A partial hydrolysis of silane and silicate in aqueous alkaline solution can be continued after acidification to a pH of 7 or less, if desired up to complete hydrolysis. The invention thus allows a variant-rich process control so that the silane-modified silicate compounds can each be adapted individually to the requirements of the passivation composition.

Adjusting to a pH of 7 or less, i.e. an acidic pH value, is carried out for the passivation composition according to the invention by adding an acid to the aqueous alkaline solution comprising completely or partially hydrolyzed or condensed, silane-modified silicate compounds. The pH can be adjusted with inorganic or with organic acids or with a mixture of acids. The pH after the addition of acid is preferably adjusted to a value between pH 2 and pH 5. Acids which contain phosphorus, such as diphosphoric acid, phosphonic acids or diphosphonic acids or a mixture of these acids are preferably used for the acidification. Advantageous is the use of, for example, (1-hydroxyethane-1,1-diyl)bisphosphonic acid, 2-phosphonobutane-1,2,4-tricarboxylic acid, aminotrimethylenephosphonic acid, ethylenediaminetetramethylenephosphonic acid, hexamethylenediaminetetramethylenephosphonic acid, hydroxyethylaminodimethylenephosphonic acid, 2-phosphonobutane-1,2,3-tricarboxylic acid, bishexamethylenetriaminepentamethylenephosphonic acid, diethylenetriaminepentamethylenephosphonic acid or 1-hydroxyethane-(1,1-diphosphonic acid) [HEDP], mixtures thereof or mixtures thereof with phosphoric or phosphonic acid. The use of these acids in the passivation composition according to the invention has a positive effect on the anti-corrosive effect. Alternatively, or in a mixture with phosphorus-containing acids, inorganic acids such as nitric acid or sulfuric acid can be used, but also organic acids such as, for example, acetic acid, acrylic acid, oxalic acid, citric acid, fumaric acid, benzoic acid, succinic acid, maleic acid, salicylic acid, aminosalicylic acid, nicotinic acid, formic acid, malic acid, tartaric acid, ascorbic acid, propanoic acid, lactic acid and phthalic acid. According to a particularly advantageous embodiment of the method according to the invention, the acidification is carried out in alignment with the metallic substrate at an optimal pH for this substrate. This material-specific optimum can be determined by a few orientating experiments.

To prepare the aqueous acidic passivation composition according to the invention, particular preference is given to using lithium polysilicate. If lithium polysilicate is used in aqueous solution to prepare a silane-modified silicate compound, an alkaline pH of above pH 9 to pH 12 is set without further intervention, which is sufficient for complete or partial hydrolysis in the alkaline medium to be readily achieved. However, water glasses such as sodium, $NH_4$ and/or potassium silicate are also suitable to be used, both on their own or in a mixture with one another, but especially in a mixture with lithium polysilicate, for the method according to the invention and to prepare the passivation composition according to the invention.

To prepare the silane-modified silicate compounds according to the invention which are used in the passivation composition, it is advantageous to use an epoxy-functional, phenoxy-functional, vinyl-functional or amino-functional silane. In particular, alkylalkoxysilanes, in this case mono-, di- or trialkylalkoxysilanes, are suitable individually or in a mixture in combination with silicates, to form an anti-corrosive coating. Particular preference is given to using silanes having at least one Si—C bond, i.e. a bond between a silicon atom and a carbon atom. Various silanes can be used in mixtures with one another. Particularly suitable silanes are methacryloxymethyltrimethoxysilane, methacryloxymethyltriethoxysilane, 3-aminopropylmethyldimethoxysilane, 3-aminopropyltriethoxysilane, N-(2-aminoethyl)-3-aminopropylmethyldimethoxysilane and 3-mercaptopropyltrimethoxysilane, N-(2-aminoethyl)-3-aminopropyltrimethoxysilane, N-(2-aminoethyl)-3-amino-propyltrimethoxysilane, N-cyclohexyl-3-aminopropyltrimethoxysilane, N-cyclohexylaminomethyltriethoxysilane, 3-aminopropyltriethoxysilane, 3-(2-aminomethylamino)propyltriethoxysilane, N-(2-aminoethyl)-3-aminopropylmethyldimethoxysilane, 3-aminopropyltrimethoxysilane, 3-ureidopropyltrimethoxysilane, vinyltrimethoxysilane, vinyldimethoxymethylsilane, vinyltriethoxysilane, vinyltriacetoxysilane, 3-methacryloxypropyltrimethoxysilane, (methacryloxymethyl)methyldimethoxysilane, methacryloxymethyltrimethoxysilane, 3-methacryloxypropyltriacetoxysilane, N-methyl[3-(trimethoxysilyl)propyl] carbamate, N-trimethoxysilylmethyl-O-methylcarbamate, N-dimethoxy(methyl)silylmethyl-O-methylcarbamate, tris[3-(trimethoxysilyl)propyl] isocyanurate, 3-glycidoxypropyltrimethoxysilane, 3-glycidoxypropyltriethoxysilane, methyltrimethoxysilane, methyltriethoxysilane, dimethyldimethoxysilane, dimethyldiethoxysilane, trimethylethoxysilane, isooctyltrimethoxysilane, isooctyltriethoxysilane, hexadecyltrimethoxysilane, (cyclohexyl)methyldimethoxysilane, dicyclopentyldimethoxysilane, phenyltriethoxysilane, triacetoxyethylsilane, 1,2-bis(triethoxysilyl)ethane.

The silane is used either individually or in a mixture with other silanes. Preference is given to using the silane as monomer but an oligomer, i.e. siloxane, may also be used or a mixture of silane and siloxane in the presence of a silicate or a mixture of silicates may be hydrolyzed and/or condensed. In the context of this invention, if silane-modified silicates are mentioned or described, the use of siloxane-modified silicates is therefore also always intended and included. The silane-modified or siloxane-modified silicates are detectable with common analytical methods, both in the aqueous passivation composition and as a dried coating on the metallic substrate, typically by ion chromatography, gel filtration chromatography, infrared spectroscopy, mass spectroscopy or by NMR spectroscopy, for example. In particular, covalent Si—O—Si—R bonds (Si: silicon, O: oxygen, R=hydrogen or organic radical) in the silane-modified silicatic base skeleton are detected.

According to an alternative embodiment, silane-modified silicates can also be prepared by hydrolysis or condensation in the alkaline pH range in a manner in which oligomers or polymers are used, which have silanes crosslinked to one another by means of reactive organic side groups. These oligomers or polymers that are used for modifying silicates bear 1 to 3 reactive organic side groups, preferably only one reactive side group. In addition, these oligomers or polymers formed from silanes have other side groups, preferably alkoxy or silanol groups. The preferred reactive group of the side groups is selected from the group comprising epoxy, amine, acrylate, isocyanate, alcohol, acid or ester groups. Mixtures of oligomers or polymers composed of silane having reactive groups on the side chains different to those mentioned above can also be used. Crosslinking can also be carried out by means of the side groups if double and triple bonds are present. If a silicate is intended to be modified with an oligomer or polymer based on a silane, it is recommended to firstly prepare the oligomer or polymer by hydrolysis or condensation of the silanes and subsequently to prepare the alkaline hydrolysis or condensation for preparing the silane-modified silicates in the presence of the silicate, preferably lithium polysilicate.

It is to be considered as a discrete advantageous embodiment of the invention that a silicate silane-modified in a first stage as described above is further modified in a second stage by further reaction with a tetraalkoxysilane, tetramethoxysilane for example. The further modification of the already silane-modified silicate is carried out in order to achieve, for example, one or more of the following effects: the molecular weight is increased, the crosslinking density is increased and/or the reactivity is increased. The subsequent hydrolysis with a tetraalkoxysilane takes place under the same conditions as has been described here in the context of the first stage of the silane modification.

Silane and silicate are used in aqueous solution in the following proportions: silane or siloxane may be used in an amount from 1% by weight to 99% by weight, based on the total amount of the silicate and silane used for the hydrolysis and/or condensation. However, silane-modified silicate compounds having only low amounts of silane, up to 20% by weight for example, already show a significantly improved corrosion protection. Particularly suitable are silane-modified silicates in which the proportion of the silane is 20% by weight or more, preferably between 40% by weight and 60% by weight. In the preparation of the silane-modified silicates, silane and silicate are each advantageously used in a ratio by weight of from 0.1:1 to 2.5:1, preferably from 0.4 to 1:1. In this case, the silane can be used as a single compound or as a mixture of silanes, the same applying to the silicate, the use of lithium silicate being preferred, both individually and in a silicate mixture. The solids content of the passivation composition generated by the method according to the invention is between 1% and 70%. The solids content is advantageously between 1% and 50%, particularly advantageously between 2% and 40%.

By means of the combined hydrolysis and condensation of silicates and silanes or siloxanes in aqueous solution at a pH equal to or greater than 8, firstly the silane-modified or siloxane-modified silicates are formed. The hydrolysis can be continued optionally after acidification to a pH equal to or less than 7. Secondly, alcohols liberated by the alkaline and optionally acidic hydrolysis in the plant can be removed, so that aqueous acidic compositions can be provided which are low in volatile organic compounds (VOC-poor) or which are free from volatile organic compounds (VOC-free). The alcohols liberated by the hydrolysis can be removed, for example, by ultramembrane filtration or reverse osmosis, but also by distillation, for example vacuum distillation. Typical aqueous alkaline or acidified compositions according to the invention for passivating metallic substrates comprise a maximum of 1% by weight of alcohol, preferably a maximum of 0.3% by weight of alcohol. The removal of the alcohol also promotes the hydrolysis or condensation reaction of the silane and the silane with the silicate.

The hydrolysis and condensation in the alkaline medium usually proceeds under the following conditions: hydrolysis and condensation takes place at room temperature, by slow addition, usually over several hours, at most up to 12 hours, of the silane or silane mixture to the silicate and with constant stirring. After completion of the addition, the mixture is advantageously stirred for a further period. The conversion can be carried out over a period of 1 to 48 hours. Further stirring after completion of the hydrolysis or condensation is also effected over at least one hour, but can also be continued for up to 24 hours to improve the application properties for example.

Acidification is generally also carried out at room temperature. The acid or acid mixture is slowly added to the fully or partially hydrolyzed and/or condensed silicate-silane mixture with constant stirring; acidification can also take 1 to 10 hours. In this case, the pH is constantly monitored and the addition is terminated when the desired pH is reached. Even after acidification, stirring is advantageously continued for a further period of 1 to 24 hours to improve the application properties.

Alternatively, it is also possible to store the alkaline silane-silicate hydrolyzate for up to 6 months, advantageously up to 3 months, and only then to acidify. It is thus possible to decouple the production of acidified, completely or partially alkaline hydrolyzed or condensed silane-modified silicates to the extent that the acidification can be carried out with a time offset without degrading quality. After a storage time of 3 or 6 months and upon subsequent acidification, a hydrolyzate or condensate with excellent anti-corrosive properties is also obtained.

According to an advantageous development of the invention, the passivation composition comprises one or more titanate and/or zirconate compounds. The titanate and/or zirconate compound can be hydrolyzed or condensed with the silane, either in the presence of the silicate or previously in a reaction only between the silane and the titanate and/or zirconate compound. If the titanate and/or zirconate compound is hydrolyzed or condensed completely or partially with the silane or siloxane beforehand, this can be carried out, for example, as disclosed in U.S. Pat. No. 5,849,110. If the titanate and/or zirconate compound is added in the presence of the silicate, this can be done either already in the alkaline hydrolysis or only after the acidification. The titanate and/or zirconate compound is incorporated into the silane-modified silicate basic skeleton to a lesser extent the later it is added; the incorporation is therefore the lowest when the titanate and/or zirconate compound is only added after acidification of the silane-modified silicate compound, especially if the hydrolysis or condensation is largely complete at this time point. Nevertheless, an improvement of the anti-corrosive effect can be observed even with the late addition of titanates or zirconates or of mixtures of titanates and/or zirconates. The titanate and/or zirconate is frequently present in the form of nanoparticles.

If the titanate and/or zirconate compound is added to the silicate simultaneously with the silane, the formation of a covalent bond between the titanate and/or zirconate compound and the silicate is also possible, comparable to the covalent bond between the silane and the silicate. Covalent bonding to silane groups bonded to the silicate is also possible and is preferred within the scope of the invention. The resulting polymer thus has the structural elements "water glass-Si—O—Ti—R" or "water glass-Si—O—Zr—R" in side-chains in a simplified representation, wherein the same letters have the same meaning as stated above, and wherein Ti is titanium and Zr is zirconium.

Particularly suitable titanates and zirconates are monoalkyltrialkoxy titanates, dialkyldialkoxy titanates, trialkylmonoalkoxy titanates and tetraalkoxy titanates such as tetra-n-butyl titanate, titanium triisostearoylisopropoxide, isopropyl trioleyl titanate, isopropyl dimethacryl isostearoyl titanate, titanium tris(dodecylbenzenesulfonate)isopropoxide, titanium tris(dioctylphosphato)isopropoxide, titanium trimethacrylate methoxyethoxyethoxide, tris(acrylato-O)(propan-2-olato)titanium, titanium, bis[2-[(2-aminoethyl)amino-kN]ethanolato-kO][2-[(2-aminoethyl)amino]ethanolato-kO](2-propanolato), bis(dioctylphosphato-O')[ethane-1,2-diolato(2-)-O,O']titanium and di(dioctylpyrophosphato) ethylene titanate. Titanium and/or zirconium compounds may also be added in the form of complexes or salts for preparing the passivation composition.

For this purpose, the titanium compound, the zirconium compound or mixtures of titanium, zirconium or titanate and zirconium compounds are mixed with the silane at room temperature. The proportion of the titanium and/or zirconium compounds in this case, including the titanates and/or zirconates, which are each used individually or as a mixture, based on the total amount of silane and titanium and zirconium compounds, is between 0.01% by weight and 50% by weight. Subsequently, this mixture (typically: silane, titanates, zirconates) in lithium polysilicate or another silicate or a mixture of silicates is added dropwise with stirring, stirred for a further period and subsequently acidified. Alternatively, the titanium or zirconium compound, typically titanate, zirconate or the mixture of these additives, can be added after acidification at room temperature. In this case, the mixture is likewise added dropwise with stirring and stirring is then continued for a further 1 to 24 hours.

The performance of the method according to the invention with mixtures of silanes, silanes and titanates and/or zirconates, and also with mixtures of silicates can be used, inter alia, to adjust the crosslinking density of the passivation layer which is produced on the metallic substrate. The crosslinking density of the passivation layer and its thickness, which can be influenced by the solids content of the passivation composition for example, influences the corrosion property of the passivation applied to the metallic substrate and dried. A higher crosslinked film can also provide good corrosion protection with a lower film thickness. In addition, the adhesion of the passivation to the metallic substrate is improved, in particular by covalent bonding of the passivation to the OH groups of the surface of the metallic substrate. The improved adhesion to the surface of the metallic substrate is possibly supported by the addition of titanates and/or zirconates.

The silane-modified silicate compounds prepared according to the invention are used to prepare an acidic aqueous passivation composition which is applied to metallic substrates. The liquid passivation composition thus initially comprises water, acid and silane-modified silicate compounds. However, it may also contain additives which improve, for example, the storage stability, the processing properties or the anti-corrosive effect of the applied coating.

These additives may be added both during alkaline hydrolysis and during or after acidification. Particular preference is given to the addition of additives after acidification. Typical additives are catalysts, wetting agents, corrosion inhibitors, stabilizers and defoamers. Individual additives are explained in more detail below in their effect in the composition according to the invention:

Metal-oxygen compounds of the metals strontium, molybdenum, vanadium, titanium, zirconium, manganese and/or tungsten are advantageously used as corrosion inhibitors in the aqueous acidic passivation composition. Preference is given to using one or more of the following compounds in the aqueous acidic composition: salts or oxides of the abovementioned metals, vanadates, molybdates, titanates, zirconates, manganates, salts and oxides of strontium and polycondensates thereof, in particular potassium orthovanadate, potassium metavanadate, sodium orthovanadate, sodium metavanadate, sodium tungstate, sodium paratungstate, vanadyl sulfate and vanadium pentoxide, and also sodium molybdate and potassium molybdate. Compounds of the metals molybdenum, vanadium and/or tungsten are used in accordance with the invention which dissociate in the aqueous acidic composition for passivation and thus release molybdenum, vanadium and/or tungsten ions. Molybdenum, vanadium and tungsten ions are incorporated into the coating applied to the metallic substrate and have the effect of providing a very good corrosion protection of the coating.

According to a preferred alternative composition for the passivation of metallic substrates, a phosphonic acid or a mixture of phosphonic acids are used as surface-active substances.

Particular preference is given to using organic phosphonic acids, for example (1-hydroxyethane-1,1-diyl) biphosphonic acid, 2-phosphonobutane-1,2,4-tricarboxylic acid, aminotrimethylenephosphonic acid, ethylenediaminetetramethylenephosphonic acid, hexamethylenediaminetetramethylenephosphonic acid, hydroxyethylaminodimethylenephosphonic acid, 2-phosphonobutane-1,2,3-tricarboxylic acid, bishexamethylenetriaminepentamethylenephosphonic acid or diethylenetriaminepentamethylenephosphonic acid or mixtures thereof.

The use of salts of phosphonic acid can also prove to be advantageous in the context of the invention. Particularly suitable are the phosphonates listed below, each of which is used individually or else in a mixture: tetrasodium (1-hydroxyethane-1,1-diyl)biphosphonate, trisodium (1-hydroxyethane-1,1-diyl)biphosphonate, pentasodium ethylenediaminetetramethylene phosphonate or heptasodium diethylenetriaminepentamethylene phosphonate. These salts dissociate in the aqueous, acidic passivation composition, so that the phosphonates are available as surface-active substances. Phosphonic acids and derivatives thereof can also be advantageously used in combination with vanadium and tungsten compounds in acidic aqueous compositions. Here, the use of phosphonic acid or phosphonates as surface-active substances has proved successful.

The addition of phosphonates allows more rapid acidification or acidification with less use of acid. In particular, a combination of phosphonates and phosphoric acid proves to be suitable for the preparation of passivation compositions with good corrosion properties.

In the context of the method according to the invention, it is preferred if the acidic aqueous passivation compositions for metallic substrates have one or more elements or compounds of the group comprising divalent, trivalent or tetravalent metal ions. According to an advantageous alternative embodiment of the invention, a passivation composition is provided which has silane-modified silicates of the composition described above and divalent, trivalent or tetravalent metal cations or a mixture of such metal cations. Preference is given to using cations of calcium, magnesium, zinc, manganese, cobalt, nickel, chromium, aluminum, strontium, barium, gallium, indium, germanium, tin, lead, As, Sb, bismuth, selenium, tellurium, titanium, vanadium, cerium, lanthanum, zirconium, molybdenum, scandium, yttrium, tantalum, iron, copper, cadmium, and tungsten or mixtures of these metal cations. Particularly preferred are aluminum and iron as trivalent cations and magnesium, zinc and manganese as divalent cations. The metal cations can also be introduced into the passivation composition as salts of acids, preferably as salts of the acids used for acidification. Typically, for example, phosphonates or biphosphonates obtained by dissolving the metals in phosphoric acid can be used. Preferred anions when using salts of the abovementioned elements are, besides phosphates or phosphonates, acetates, chlorides, nitrates, sulfates and carbonates. By adding these elements or compounds thereof, preferably salts and oxides thereof, a further improvement to the anticorrosive properties of the passivation according to the invention is achieved.

Since silicates precipitate when water glasses with divalent, trivalent or tetravalent metal ions are added, and since metal hydroxides or metal oxides precipitate simultaneously from this mixture, it is astonishing to those skilled in the art that the acidified passivation composition comprising silane-modified silicates has good dissolution capacity for divalent and trivalent metal cations.

The aqueous acidic passivation compositions for metallic substrates according to the invention are generally suitable for all metallic surfaces or substrates, but particularly well for workpieces with a surface of steel, iron, aluminum or zinc, but especially also for workpieces whose surface is provided with an alloy of one or both of the metals aluminum and zinc with further metals. Typically suitable are, for example, a zinc-aluminum alloy, an aluminum alloy or a zinc alloy with further metals such as, for example, iron or magnesium, with a zinc-iron alloy for example, all of which can be provided with an anti-corrosive coating. The layer thickness of the coating of metal or alloy applied is between 5 μm and 100 μm. The metallic alloy applied to a substrate appears as a discrete layer. As described above, metal ions can be incorporated into the passivation layer by the acidic passivation according to the invention and be detected as, for example, Zn/Fe silicate. Typical applications for an aqueous acidic passivation composition comprising a silane-modified silicate compound are the passivation of electrolytically galvanized piece goods or bulk goods, in particular screws and punched bent parts, and coil coating, i.e. the passivation of strip steel.

The passivation composition according to the invention can be applied to a metallic substrate as a single coating. However, this passivation composition can also be applied in conjunction with further coating compositions, for example the acidic passivation according to this invention can be coated with an alkaline passivation.

Details of the method according to the invention for producing a silane-modified silicate are explained in more detail below with reference to working examples.

In the context of this invention, unless otherwise described, quantities or proportions of components are always based on 100% substance and on the total composition listed in Table 1.

Table 1 shows, in the left column, besides water, firstly the silanes used in connection with the working examples, and in the rows below particularly suitable silicates are listed which have been used for carrying out the alkaline condensation and hydrolysis. Then follows, in the lines below, various organic and inorganic acids which are used to acidify the completely or partially alkaline-hydrolyzed silanes or siloxanes and silane-modified silicates. Finally, phosphonic acids which are used as surface-active systems are listed. In two cases, sodium permanganate is used.

At the end of the table, corrosion inhibitors, in this case vanadates, vanadyl sulfate, tungstate and molybdates, which were used in individual experiments, have been listed.

For the preparation of the acidified, alkaline-hydrolyzed and condensed silane-modified silicates listed in Table 1, it should be noted that all method steps were carried out at room temperature in each case. The silicate component, i.e. individual silicates or mixtures of silicates, was initially charged. A pH value of between 9 and 12 was established, i.e. an alkaline pH, depending on the composition of the silicate component. The silane component, i.e. individual silanes or mixtures of silanes, optionally with addition of titanates or zirconates, was added dropwise with stirring. The silane component was added dropwise over a period of three hours in each case; after complete dropwise addition of the silane component, the mixture is again stirred for a further three hours. Released alcohol is removed by distillation so that the hydrolyzate has an alcohol content of less than 0.3% by weight. At the end of this method step, the silane component is largely hydrolyzed and condensed with the silicate, but it cannot be ruled out that still some slight hydrolysis in an acidic environment is possible in comparison with the alkaline hydrolysis. It has been found that, for the preparation of a passivation composition with anti-corrosive properties, it is not necessary for the hydrolysis to proceed completely in the alkaline state. It is also possible to carry out the hydrolysis only partially in the alkaline state, for example, half or two-thirds and then to hydrolyze to completion in an acidic environment.

The acid component is then added to this alkaline hydrolyzate, again with stirring over a period of three hours. It is desirable to set a pH equal to or less than 4 by adding an acid or a mixture of acids. After the desired pH of maximum 4 is reached, the mixture is stirred for a further three hours. The reference experiments with a silane-modified silicate produced by alkaline hydrolysis, which is used without subsequent acidification, and with a silane-modified silicate obtained by acidic hydrolysis and condensation, was obtained in the same manner by hydrolysis at room temperature.

The passivation composition obtained as a result of this preparation process and also reference compositions are in each case knife-coated on hot-dip galvanized steel plates (DC 54 Z 100) and subjected to a salt spray test according to DIN EN ISO 9227, the first white rust which forms being evaluated. Per test, 10 sheets each were coated; the results reported in Table 1a-1c are mean values. The hot dip galvanized steel sheets were cleaned by alkaline degreasing, then rinsing with acid and then with deionized water before applying the passivation composition. In the evaluation, the evaluation of the experiments is based on the reference test "reference 1" with an alkaline-hydrolyzed silane-silicate condensate. The sheet coated with "reference 1" showed a resistance to white rust of 48 hours. Test results with a white rust resistance of 24 hours to 48 hours were rated as satisfactory results (0), test results with a white rust resistance of more than 48 hours to 72 hours were rated as good results (+) and test results with a white rust resistance of more than 72 hours were rated as excellent (++).

For the alkaline hydrolysis, the silane component was used in a ratio by weight to the silicate component of from 0.16:1 to 2.1:1. The best corrosion protection results were achieved when a ratio by weight of silane component to silicate component was adjusted to from 0.4:1 to 1:1.

For carrying out the experiments presented in Table 1, the corrosion inhibitors were added individually or in a mixture during the alkaline hydrolysis in an amount of 0.1% by weight to 5% by weight, based on the total composition. However, they can also be added with an equivalent effect only during or after acidification.

The surface-active substances are added during the acidification in an amount of 0.1% by weight to 2% by weight, based on the total composition.

The silane-modified silicates prepared in this way were applied by knife-coating onto galvanized iron sheets. The dried layer, which can be detected on the galvanized iron sheets, has a layer thickness of approx. 150 nm, unless otherwise stated.

In addition to experiments 1-30, which implement the method according to the invention, an alkaline hydrolysis of silanes and condensation with silicates was carried out without subsequent acidification as a reference experiment. The silane-modified silicates thus obtained were also applied in molten form to galvanized iron sheets, and the galvanized iron sheets coated with silane-modified silicates prepared according to the invention were compared with the results according to the prior art. It has been found that at least equivalent results, but predominantly significantly improved, in some cases excellent anti-corrosive protection values have been achieved by the alkaline-hydrolyzed and condensed and acidified silane-modified silicates according to the invention.

The silane component and the silicate component can be used not only in relation to one another within a wide range of proportions. The proportion of the silane and silicate component used for preparing the passivation composition of silane-modified silicates can also be varied within very wide limits and can thus be adjusted to a wide range of application requirements. It is noteworthy that the experiments with a low proportion of silane and silicate component (experiments 16-18) provide excellent corrosion protection results, even without the use of corrosion inhibitors. With the passivation compositions prepared according to experiments 16-18, particularly thin coatings of, for example, less than 150 nm can be prepared. Particularly the formulations which have only a small proportion of the silane and silicate component—and thus having a low solids content of less than 5%—exhibit the advantageous effect of the use of phosphonic acid for acidification, e.g. in the comparison of experiments 13 and 21 with experiments 16-18.

If coatings with a higher layer thickness are desired, the proportion of silane and silicate component in the total composition can be increased up to 99%. Experiment No. 28 shows satisfactory corrosion protection results for a proportion of 30% by weight each of silane and silicate component.

Very good corrosion protection results are achieved when the proportion of silane and silicate component in the total composition is between 20% by weight and 40% by weight, in particular between 30% by weight and 35% by weight (e.g. experiments 6, 7, 10, 12). The solids content of the passivation composition obtained by the method according to the invention is preferably between 3% and 66%, particularly advantageously between 3.1% and 36%.

With regard to the silicates used, it is to be noted that lithium polysilicate generally produces good and excellent corrosion protection results, unlike, for example, sodium water glass alone.

Among the acids used, organic acids are in principle as suitable as inorganic acids. However, particularly good to excellent corrosion protection results are achieved when phosphorus and/or phosphonic acid is added. For this purpose, it should be noted that the phosphonic acids or phosphonates mentioned as corrosion inhibitors are also suitable for acidifying the alkaline-hydrolyzed silane-modified silicates and are even suitable in low amounts of 0.1% by weight and 1% by weight (see in this regard e.g. experiments 3, 7, 15 and 20) to effect satisfactory corrosion protection results. This is due to the fact that phosphonates often still have acidic residual functionalities which lead to the pH being lowered after addition of the phosphonates.

TABLE 1a

Formulations for preparing silane-modified silicates obtained by alkaline hydrolysis at a pH between 9 and 11 and subsequent acidification to pH 4

| (Solid) proportion component/variant | 1 | 2 | 3 | 4 | 5 | 6 | 7 | 8 | 9 | 10 |
|---|---|---|---|---|---|---|---|---|---|---|
| Water | 48 | 53 | 59 | 54 | 65 | 61 | 64 | 72 | 75 | 68 |
| Silane component | | | | | | | | | | |
| Methacryloxymethyltriethoxysilane | | | | | | 10 | | | | |
| N-[3-(trimethoxysilyl)propyl]ethylenediamine | | | | | | | 5 | | 7 | 15 |
| 3-Aminopropyltriethoxysilane | | 25 | | | | | | | | |
| Vinyltriethoxysilane | 30 | | | | | | | | 2 | |
| Vinyltrimethoxysilane | | | | 23 | | | | | | |
| Methyltrimethoxysilane | | | | | | | 1 | | | |
| 3-Mercaptopropyltrimethoxysilane | | | | | | | | 7 | | |
| CoatOSil MP 200 | | | | 10 | | | | | | |
| 3-Glycidyloxypropyltrimethoxysilane | | | | | | | | 10 | | |
| 3-Aminopropylmethyldiethoxysilane | | | | | | | | | 3 | |
| N-(2-aminoethyl)-3-aminopropylmethyldimethoxysilane | | | | | | | | | | 1 |
| Silicate component | | | | | | | | | | |
| Lithium polysilicate (23%) | 21 | | 19 | | | 23 | | | | 15 |
| Sodium waterglass (30%) | | 20 | | | 30 | | | 13 | | |
| Colloidal silicate (30%) | | | 30 | 23 | | | 15 | | | |
| Acid | | | | | | | | | | |
| Citric acid | | | | | | 2 | | | | |
| Oxalic acid | | | | | | | | | | 1 |
| Salicylic acid | | | | | | | 2 | | | |
| Succinic acid | | | | | | | | 2 | | |
| HNO₃ 65% | 1 | | | | | | | | | |
| Sulfuric acid 95% | | 1 | | | | | | | | |
| Phosphoric acid 85% | | | | | 1 | | | | | |
| Phosphonic acid 50% | | | | | | | | | 1 | |
| Corrosion inhibitors | | | | | | | | | | |
| Sodium vanadate | | | | | 1 | | | | | |
| Potassium vanadate | | | | | | | | | | 1 |

TABLE 1a-continued

Formulations for preparing silane-modified silicates obtained by alkaline hydrolysis at a pH between 9 and 11 and subsequent acidification to pH 4

| (Solid) proportion component/variant | 1 | 2 | 3 | 4 | 5 | 6 | 7 | 8 | 9 | 10 |
|---|---|---|---|---|---|---|---|---|---|---|
| Vanadyl sulfate | | 1 | | | | | | | | |
| Sodium tungstate | | | | | | | 1 | | | |
| Sodium molybdate | | | | | | | | 1 | | |
| Potassium molybdate | | | | | | | | | 1 | |
| surface-active substances | | | | | | | | | | |
| 1-Hydroxyethane-1,1-diphosphonic acid | | | | | | | 1 | | | |
| Aminotris(methylenephosphonic acid) | | | | | | | | | | |
| Ethylenediaminetetra(methylenephosphonic acid) | | | | | | 2 | | | | |
| Diethylenetriaminepenta(methylenephosphonic acid) | | | | | 1 | | | | | |
| Hexamethylenediaminetetra(methylenephosphonic acid) | | | | | | | | | | |
| Hydroxyethylaminodi(methylenephosphonic acid) | | | | | | | | | | 1 |
| 2-Phosphonobutane-1,2,4-tricarboxylic acid | | | | 1 | | | | | | |
| Bis(hexamethylenetriaminepenta(methylenephosphonic acid)) | | | | | | | | | | |
| Sodium permanganate | | | | | | | | | | |
| Total | 100 | 100 | 100 | 100 | 100 | 100 | 100 | 100 | 100 | 100 |
| Corrosion protection properties | 0 | 0 | + | + | 0 | + | ++ | 0 | + | ++ |

TABLE 1b

Formulations for preparing silane-modified silicates obtained by alkaline hydrolysis at a pH between 9 and 11 and subsequent acidification to pH 4

| (Solid) proportion component/variant | 11 | 12 | 13 | 14 | 15 | 16 | 17 | 18 | 19 | 20 |
|---|---|---|---|---|---|---|---|---|---|---|
| Water | 94.8 | 67.5 | 96 | 96.9 | 97 | 93.9 | 93.5 | 93.5 | 59.9 | 77.9 |
| Silane component | | | | | | | | | | |
| Methacryloxymethyltriethoxy silane | | | | | | | | | | 1 |
| N-[3-(trimethoxysilyl)propyl] ethylenediamine | | 20 | | | 1 | | 2 | | | |
| 3-Aminopropyltriethoxysilane | | | | | | | | | | |
| Vinyltriethoxysilane | 2 | | | | | | | | | |
| Vinyltrimethoxysilane | | 1 | | | | | | | | |
| Methyltrimethoxysilane | | | | | | 0.1 | | | | 0.1 |
| 3-Mercaptopropyltrimethoxy silane | | | | | | | | | | |
| CoatOSil MP 200 | 2 | | 1.5 | | | | | 2 | 15 | 5 |
| 3-Glycidyloxypropyltrimethoxy silane | | | | 1 | | | | | | |
| 3-Aminopropylmethyldiethoxy silane | | | | | | | 2 | | | |
| N-(2-aminoethyl)-3-amino propylmethyldimethoxysilane | | | | | | | | | | |
| Silicate component | | | | | | | | | | |
| Lithium polysilicate (23%) | | 10 | | 1 | | 2 | 2.5 | 2 | 20 | |
| Sodium waterglass (30%) | | | | | | | | | | |
| Colloidal silicate (30%) | | | 1.5 | | 1 | | | | | 15 |
| Acid | | | | | | | | | | |
| Citric acid | | | | | | | | | | |
| Oxalic acid | | | | | | | | | | 5 |
| Salicylic acid | | | | | | | | | | |
| Succinic acid | | | | | | | | | | |
| HNO$_3$ 65% | 1 | | | | | | | | | |
| Sulfuric acid 95% | | | | | | 1 | | | | |
| Phosphoric acid 85% | | | 1 | | | | | | | |
| Phosphonic acid 50% | | 1.5 | | 1 | | | 2 | 1.5 | | |
| Corrosion inhibitors | | | | | | | | | | |
| Sodium vanadate | | | | | | | | | | |
| Potassium vanadate | | | | | | | | | | |
| Vanadyl sulfate | 0.1 | | | 0.1 | | | | | | |
| Sodium tungstate | | | | | | | | | | |
| Sodium molybdate | | | | | | | | | | |
| Potassium molybdate | | | | | | | | | | |

TABLE 1b-continued

Formulations for preparing silane-modified silicates obtained by alkaline hydrolysis at a pH between 9 and 11 and subsequent acidification to pH 4

| (Solid) proportion component/variant | 11 | 12 | 13 | 14 | 15 | 16 | 17 | 18 | 19 | 20 |
|---|---|---|---|---|---|---|---|---|---|---|
| surface-active substances | | | | | | | | | | |
| 1-Hydroxyethane-1,1-diphosphonic acid | 0.1 | | | 1 | 1 | | 1 | | | |
| Aminotris(methylenephosphonic acid) | | | | | | | | | | |
| Ethylenediaminetetra(methylenephosphonic acid) | | | | | | | | | | |
| Diethylenetriaminepenta(methylenephosphonic acid) | | | | | | | | | | |
| Hexamethylenediaminetetra(methylenephosphonic acid) | | | | | | | | | | |
| Hydroxyethylaminodi(methylenephosphonic acid) | | | | | | | | | | |
| 2-Phosphonobutane-1,2,4-tricarboxylic acid | | | | | | | | | | |
| Bis(hexamethylenetriaminepenta(methylenephosphonic acid)) | | | | | | | | | | 1 |
| Sodium permanganate | | | | | | | | | 0.1 | |
| Total | 100 | 100 | 100 | 100 | 100 | 100 | 100 | 100 | 100 | 100 |
| Corrosion protection properties | + | ++ | 0 | ++ | 0 | + | ++ | ++ | + | 0 |

TABLE 1c

Formulations for preparing silane-modified silicates obtained by alkaline hydrolysis at a pH between 9 and 11 and subsequent acidification to pH 4

| (Solid) proportion component/variant | 21 | 22 | 23 | 24 | 25 | 26 | 27 | 28 | 29 | 30 | Reference 1 |
|---|---|---|---|---|---|---|---|---|---|---|---|
| Water | 95 | 85.5 | 84 | 76 | 74 | 67 | 83 | 34 | 57.3 | 64 | 79 |
| Silane component | | | | | | | | | | | |
| Methacryloxymethyltriethoxy silane | | | 5 | | | | | | | | |
| N-[3-(trimethoxysilyl)propyl]ethylenediamine | | 2.5 | | | | | | 30 | | | 10 |
| 3-Aminopropyltriethoxysilane | | | | | | | | | | | |
| Vinyltriethoxysilane | | | | 10 | | | | | | | |
| Vinyltrimethoxysilane | | | | | | | | | | | |
| Methyltrimethoxysilane | | 1 | | | | 1 | | | | | |
| 3-Mercaptopropyltrimethoxy silane | | | | | | | | | | | |
| CoatOSil MP 200 | 1 | | | | 5 | | | | 10 | 10 | |
| 3-Glycidyloxypropyltrimethoxy silane | | | | | | 5 | | 10 | | | |
| 3-Aminopropylmethyldiethoxy silane | | | | | 10 | | | | | | |
| N-(2-aminoethyl)-3-aminopropylmethyldimethoxysilane | | | | | | | 1 | | | | |
| Silicate component | | | | | | | | | | | |
| Lithium polysilicate (23%) | | 5 | 5 | | 10 | | 5 | 30 | 25 | 15 | |
| Sodium waterglass (30%) | | | | | | 22 | | | | 2 | |
| Colloidal silicate (30%) | 2 | | 10 | | | | | | | 3 | |
| Acid | | | | | | | | | | | |
| Citric acid | | | | | | 2 | | | | | |
| Oxalic acid | | | | | | | 5 | | | | |
| Salicylic acid | | | | | | 2 | | | | | |
| Succinic acid | | | | | 5 | | | | | | |
| HNO$_3$ 65% | | 1 | | | | | | 5 | | | |
| Sulfuric acid 95% | | | | | | | | | | | |
| Phosphoric acid 85% | | | 5 | 3 | | | | | 7.5 | | |
| Phosphonic acid 50% | | | | 5 | | | | | | 5 | |
| Corrosion inhibitors | | | | | | | | | | | |
| Sodium vanadate | | 0.5 | | | | | | | | | |
| Potassium vanadate | | | | | | | | | | 1 | |
| Vanadyl sulfate | | | | | | | | | 1 | | |
| Sodium tungstate | | 0.5 | | | | | | | | | |
| Sodium molybdate | | | | | | | | | | | |
| Potassium molybdate | | | | | | | | | | | |

TABLE 1c-continued

Formulations for preparing silane-modified silicates obtained by alkaline hydrolysis at a pH between 9 and 11 and subsequent acidification to pH 4

| (Solid) proportion component/variant | 21 | 22 | 23 | 24 | 25 | 26 | 27 | 28 | 29 | 30 | Reference 1 |
|---|---|---|---|---|---|---|---|---|---|---|---|
| surface-active substances | | | | | | | | | | | |
| 1-Hydroxyethane-1,1-diphosphonic acid | 1 | | | | | | | | | | |
| Aminotris(methylenephosphonic acid) | | 1 | | | | | | | | | |
| Ethylenediaminetetra(methylenephosphonic acid) | | | | | | | 1 | | | | |
| Diethylenetriaminepenta(methylenephosphonic acid) | | | | | 1 | | | | | | |
| Hexamethylenediaminetetra(methylenephosphonic acid) | | | | 1 | | | | | | | |
| Hydroxyethylaminodi(methylenephosphonic acid) | | | | | | | | | | | |
| 2-Phosphonobutane-1,2,4-tricarboxylic acid | | | | | 1 | | | | | | |
| Bis(hexamethylenetriaminepenta(methylenephosphonic acid)) | | | | | | | 1 | | | | |
| Sodium permanganate | | | | | | | | | 0.2 | | |
| Total | 100 | 100 | 100 | 100 | 100 | 100 | 100 | 100 | 100 | 100 | 100 |
| Corrosion protection properties | 0 | + | ++ | 0 | + | 0 | + | 0 | ++ | ++ | 0 |

Reference 1: alkaline silane-silicate hydrolyzate

According to an alternative working example, the passivation composition according to the invention is prepared by first mixing GLYMO 3-glycidyloxypropyltrimethoxysilane (Evonik) and DAMO n-(2-aminoethyl)-3-aminopropyltrimethoxysilane (Evonik); in each case 100% substance, in the ratio 1:1 and stirring at 30° C. for 24 hours under atmospheric humidity or optionally with addition of water (1%). The oligomer or polymer based on silanes thus obtained is added in accordance with the invention in the proportion of 30:70 oligomer:silicate, based on the silicate solid. For the present working example, lithium polysilicate with 23% solids is used. The methanol formed in the hydrolysis or condensation is distilled off and, after completion of the hydrolysis or condensation, the pH is adjusted to 4 in accordance with the invention by addition of an acid or salts. For the present working example, HEDP (1-hydroxyethane(1-1-diphosphonic acid)) is used.

The invention claimed is:

1. A method for using a silane-modified silicate comprising the steps of
   at least partially hydrolyzing and/or condensing at least one silane in the presence of at least one silicate at a pH equal to or greater than 8, and then
   adjusting to a pH equal to or less than 7 by adding an acid.

2. The method as claimed in claim 1, characterized in that the hydrolysis and/or condensation of the silane is continued in the presence of the silicate after adjusting the pH to equal to or less than 7.

3. The method of claim 1 wherein the at least one silicate is selected from the group consisting of lithium polysilicate, a sodium water glass, a potassium water glass, an ammonium water glass, and combinations thereof.

4. The method of claim 1, wherein the at least one silane has at least one bond between a silicon atom and a carbon atom (Si—C bond).

5. The method of claim 1, wherein the silane is selected from the group of functional silanes consisting of an epoxy-functional silane, a vinyl-functional silane, an amino-functional silane, an acrylic-functional silane, a urea-functional silane, a hydroxy-functional silane, a thiol-functional silane, and mixtures thereof.

6. The method of claim 5, wherein the functional silane is at least partially covalently bonded to the at least one silicate.

* * * * *